United States Patent [19]
Taber et al.

[11] Patent Number: 5,685,443
[45] Date of Patent: Nov. 11, 1997

[54] COMPOSITE CLOSURE AND METHOD OF MAKING SAME

[75] Inventors: James Taber, Aurora; F. Paul Marshall, Orland Park; Douglas G. Begley, Palatine, all of Ill.

[73] Assignee: White Cap, Inc., Downers Grove, Ill.

[21] Appl. No.: 398,924

[22] Filed: Mar. 6, 1995

[51] Int. Cl.⁶ .................................................. B65D 43/02
[52] U.S. Cl. ............................ 215/252; 215/256; 215/318
[58] Field of Search ............................ 215/252, 317, 215/352, 256, 230; 264/268, 271.1

[56] References Cited

U.S. PATENT DOCUMENTS

| | | | |
|---|---|---|---|
| 1,413,257 | 4/1922 | Carvalho | 215/352 X |
| 1,908,245 | 5/1933 | Hogg . | |
| 2,162,752 | 6/1939 | Schauer . | |
| 2,700,186 | 1/1955 | Stover . | |
| 3,163,310 | 12/1964 | Blakslee | 215/352 X |
| 3,307,728 | 3/1967 | Elser | 215/352 X |
| 3,603,472 | 9/1971 | Lecimski, Jr. et al. . | |
| 3,820,678 | 6/1974 | Zipper et al. . | |
| 3,875,654 | 4/1975 | Ushijima . | |
| 3,913,771 | 10/1975 | Acton et al. | 215/256 |
| 3,920,141 | 11/1975 | Bojardi . | |
| 3,930,588 | 1/1976 | Coursaut . | |
| 4,133,462 | 1/1979 | Lindström . | |
| 4,227,618 | 10/1980 | Zipper . | |
| 4,330,067 | 5/1982 | Deussen . | |
| 4,340,149 | 7/1982 | Mori et al. | 215/343 |
| 4,368,828 | 1/1983 | Samuel et al. | 215/349 X |
| 4,478,343 | 10/1984 | Ostrowsky | 215/252 |
| 4,493,427 | 1/1985 | Wolkonsky . | |
| 4,511,053 | 4/1985 | Brandes . | |
| 4,560,076 | 12/1985 | Boik | 215/252 |
| 4,572,388 | 2/1986 | Luker et al. | 215/252 |
| 4,610,367 | 9/1986 | Massott et al. . | |
| 4,679,696 | 7/1987 | Bonnenfant et al. . | |
| 4,694,969 | 9/1987 | Granat | 215/252 |
| 4,694,970 | 9/1987 | Hayes | 215/252 |
| 4,721,219 | 1/1988 | Dullabaun et al. | 215/230 X |
| 4,746,026 | 5/1988 | Leonhardt . | |
| 4,787,530 | 11/1988 | Edwards . | |
| 4,801,029 | 1/1989 | Begley . | |
| 4,801,030 | 1/1989 | Barriac | 215/252 |
| 4,813,561 | 3/1989 | Ochs | 215/252 |
| 4,851,176 | 7/1989 | Christiansen et al. . | |
| 4,978,016 | 12/1990 | Hayes | 215/252 |
| 4,981,230 | 1/1991 | Marshall et al. | 215/252 |
| 4,989,740 | 2/1991 | Vercillo | 215/252 |
| 4,993,570 | 2/1991 | Julian et al. . | |
| 5,007,545 | 4/1991 | Imbery, Jr. | 215/252 X |
| 5,076,453 | 12/1991 | Odet . | |
| 5,078,290 | 1/1992 | Ochs . | |
| 5,145,078 | 9/1992 | Hannon et al. | 215/252 |
| 5,160,687 | 11/1992 | Margaria | 215/230 X |
| 5,450,973 | 9/1995 | Ellis et al. | 215/252 |

FOREIGN PATENT DOCUMENTS 514553  10/1952  France .

*Primary Examiner*—Stephen P. Garbe
*Attorney, Agent, or Firm*—Lockwood, Alex, FitzGibbon & Cummings

[57] ABSTRACT

A closure for press-on application to, and rotational removal from, a container having a cylindrical neck which includes a plurality of vertically spaced helical threads formed on the outer surface thereof. The closure includes an end panel member having a central portion formed of metal or other suitable oxygen barrier material which is adapted to overlie a mouth of the container. A generally cylindrical plastic skirt on the closure is formed by molding the same in surrounding and capturing relation to the end panel and at least a portion of the upper and lower surfaces of the end panel are generally free of plastic. The closure also includes a gasket which is engageable with the neck portion of the container to provide a seal therewith. A free edge on the outer periphery of the end panel member is encapsulated by at least one of said gasket and said molded plastic skirt.

65 Claims, 10 Drawing Sheets

FIG. 8
FIG. 9
FIG. 10
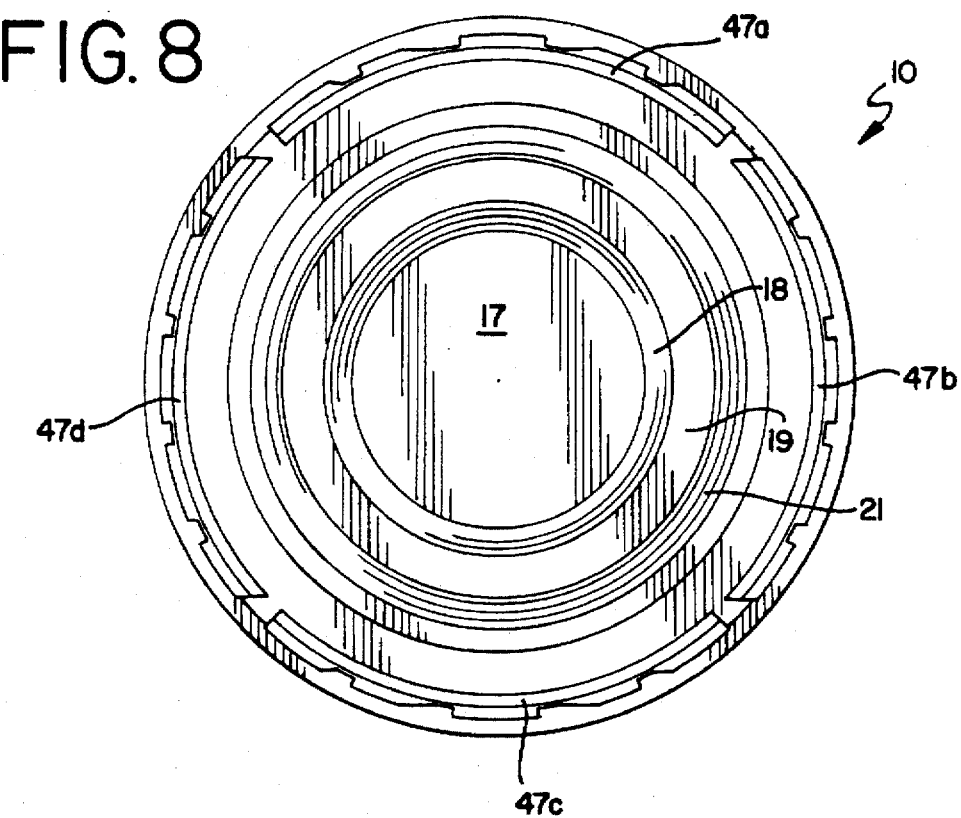
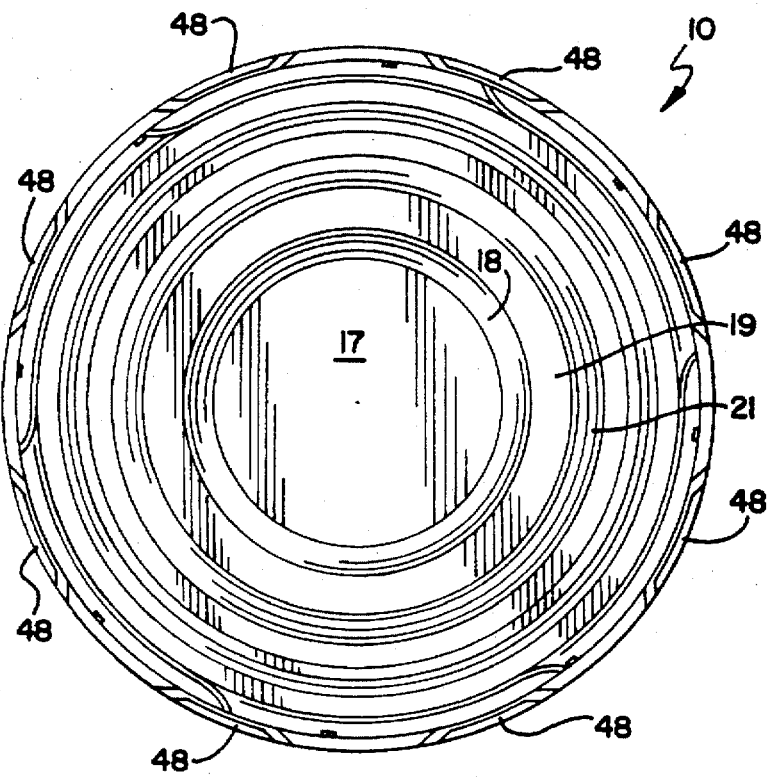
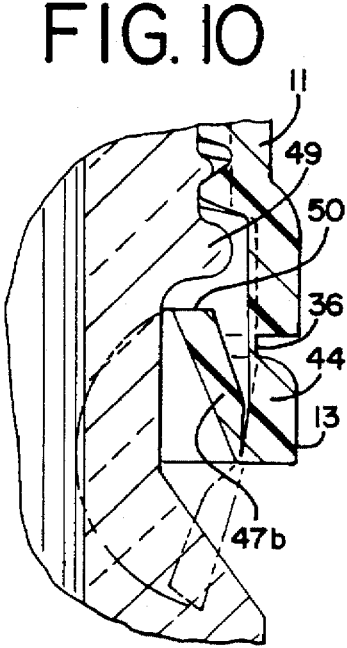

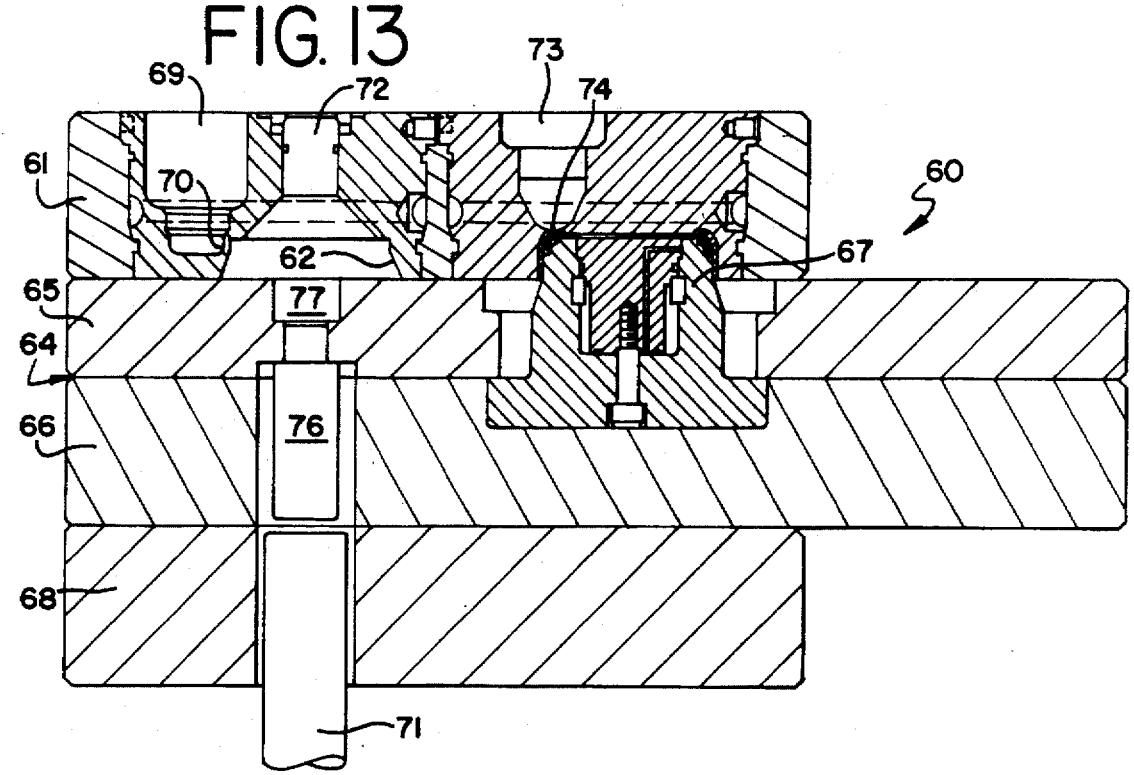
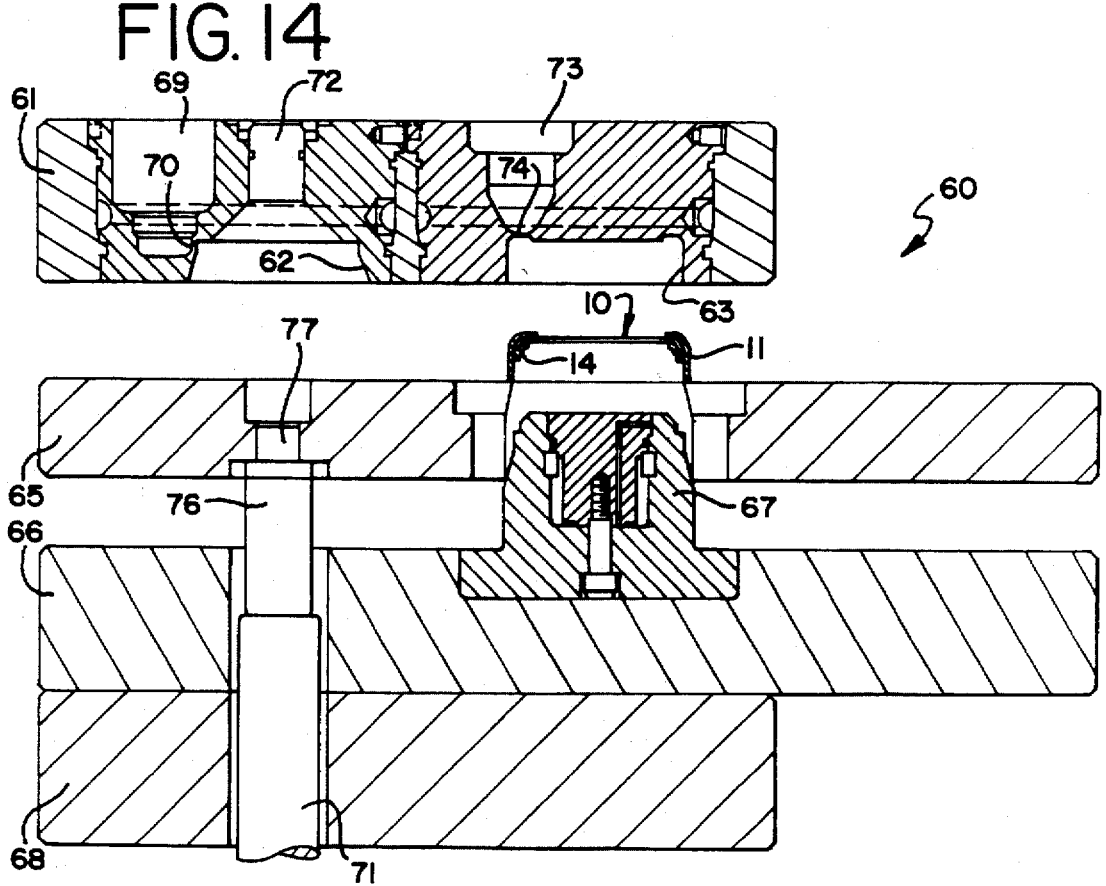

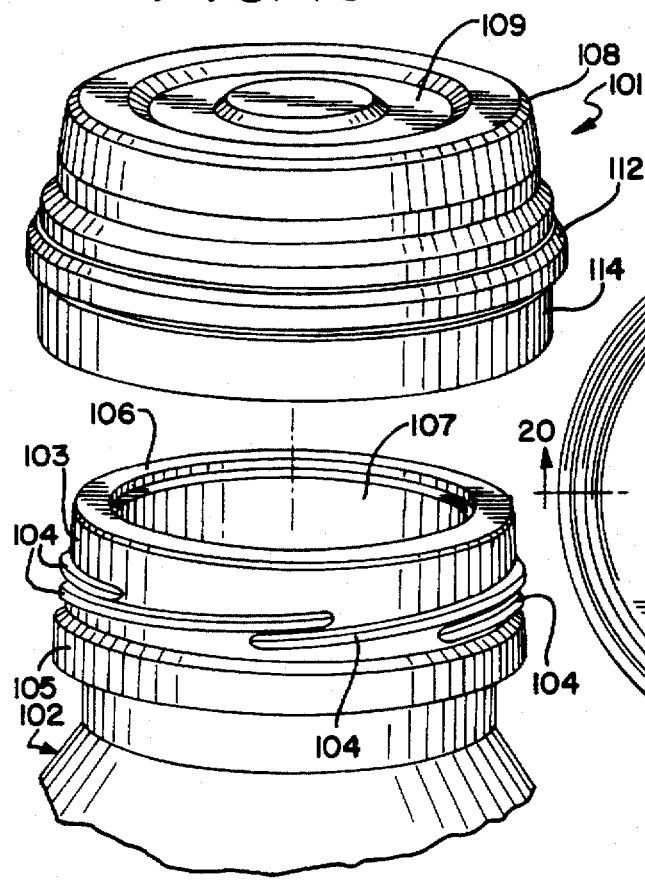
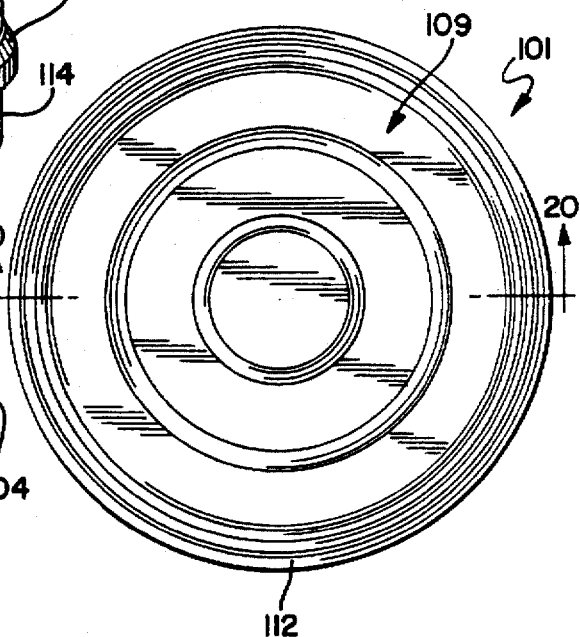
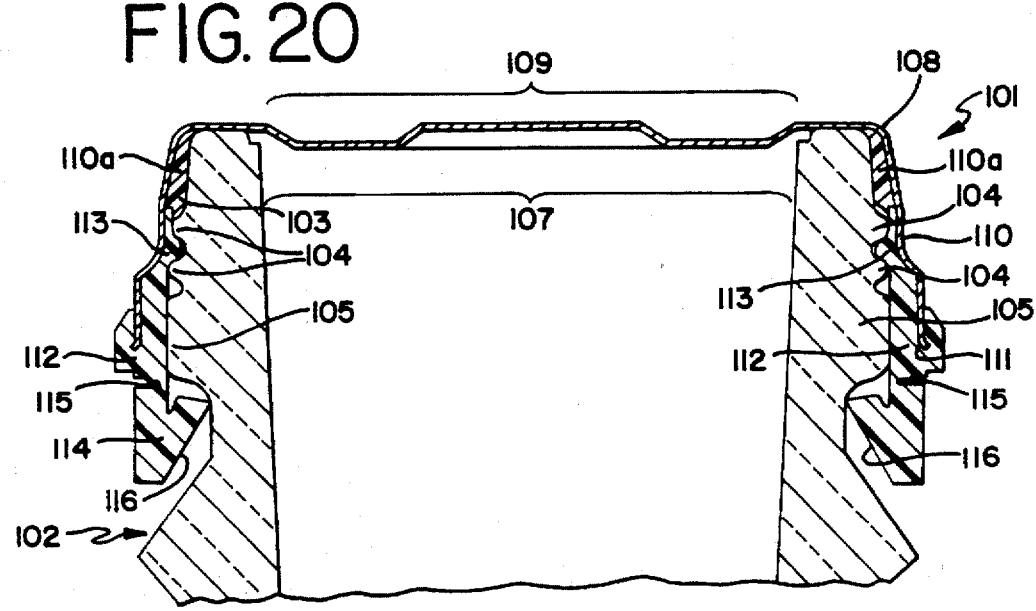

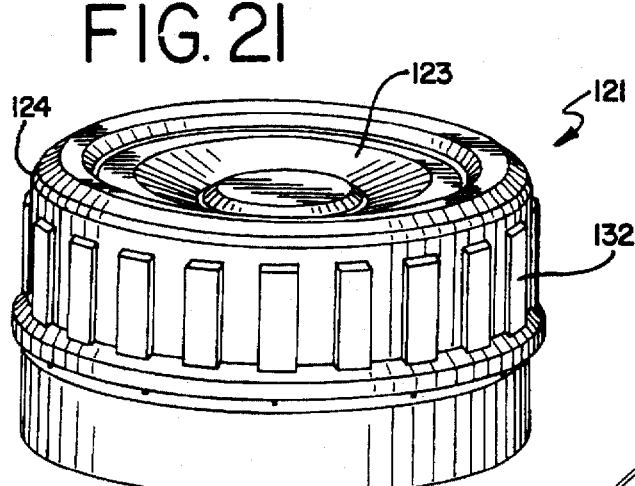
FIG. 21
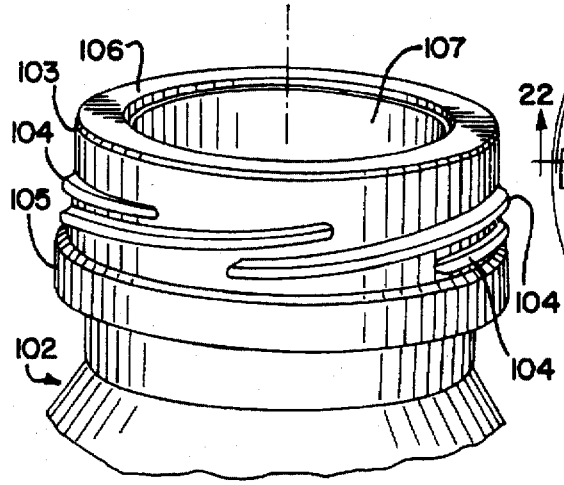
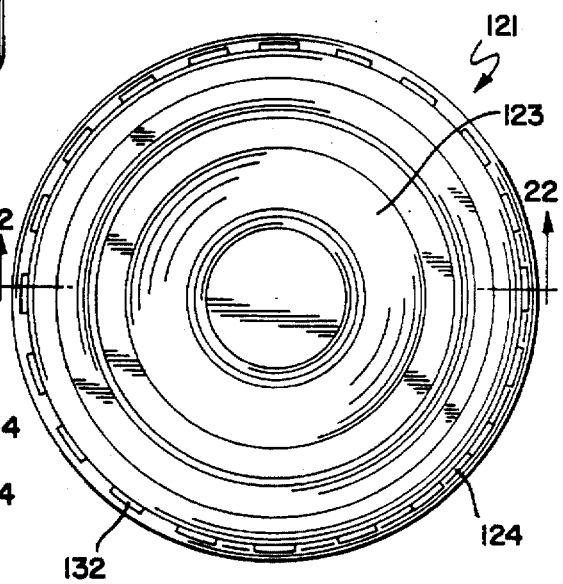
FIG. 22
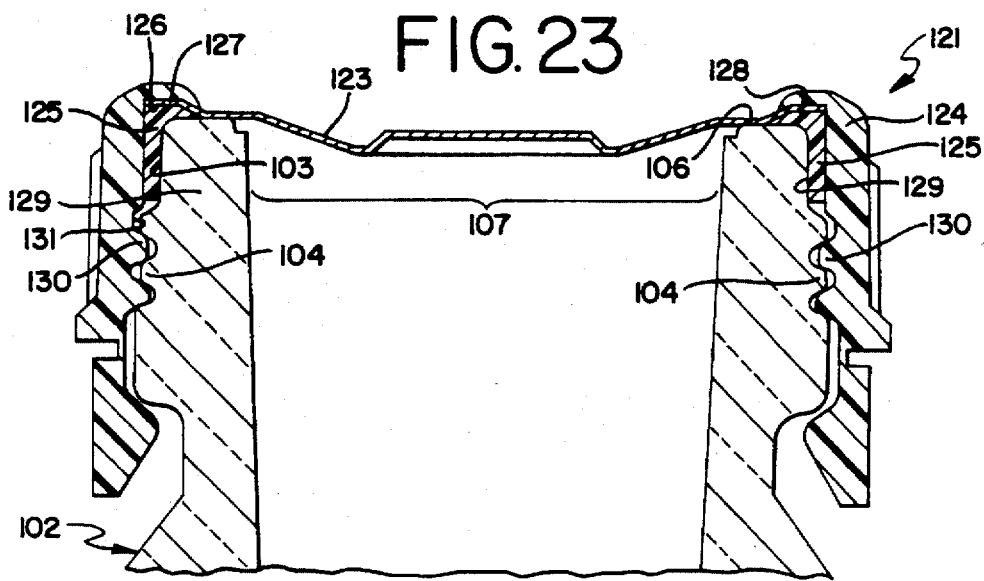
FIG. 23

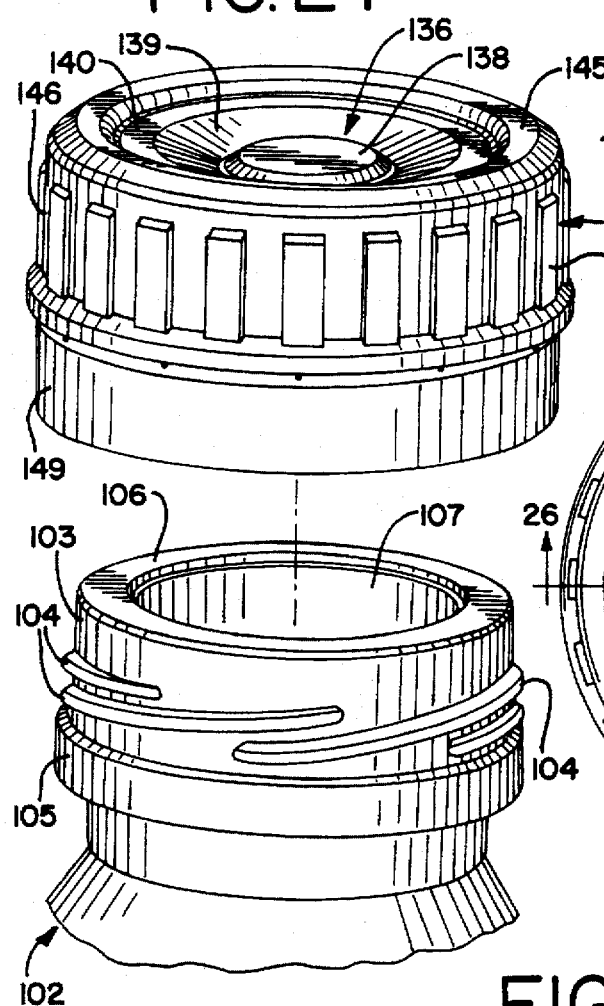
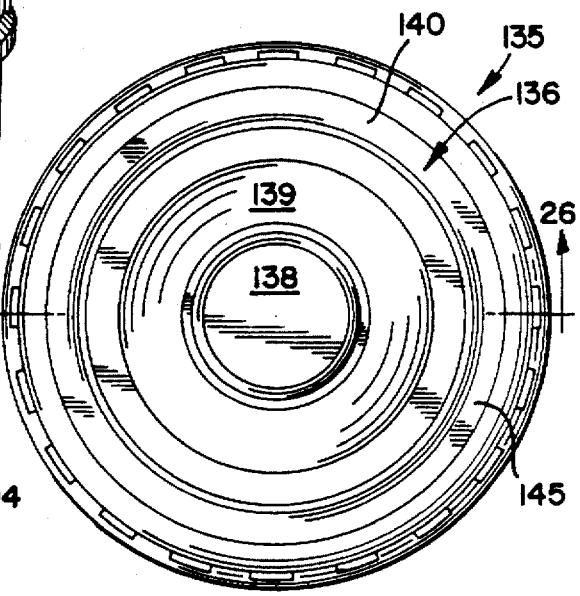
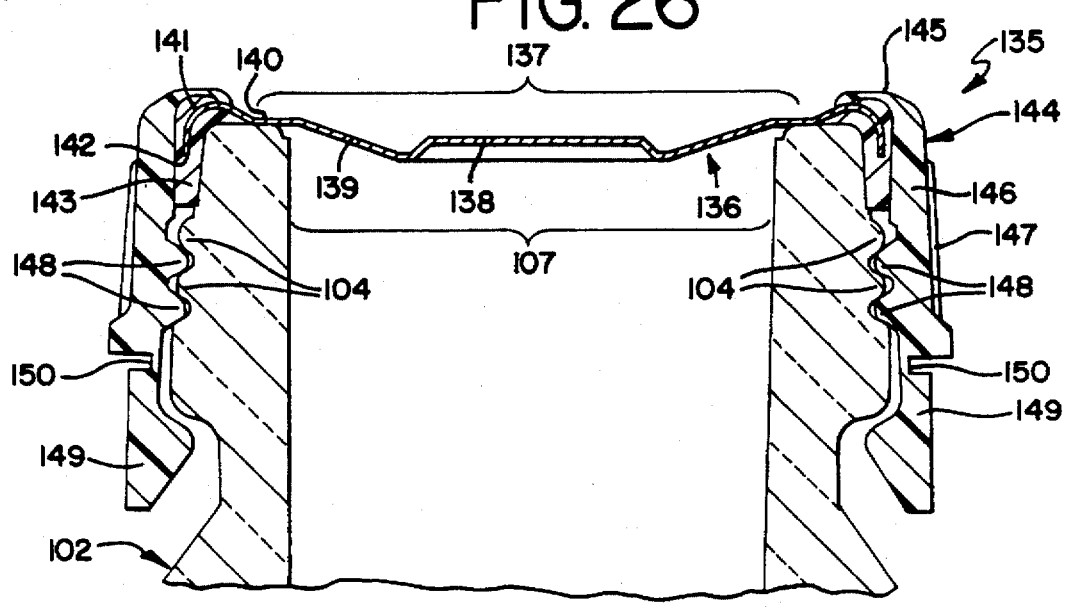

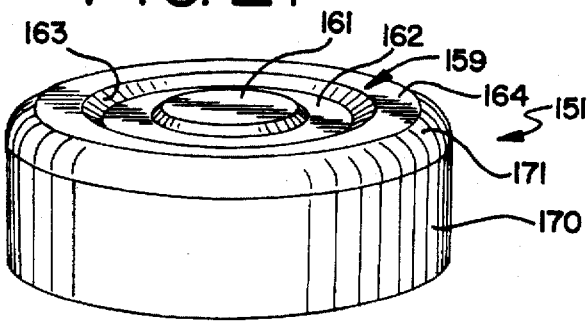
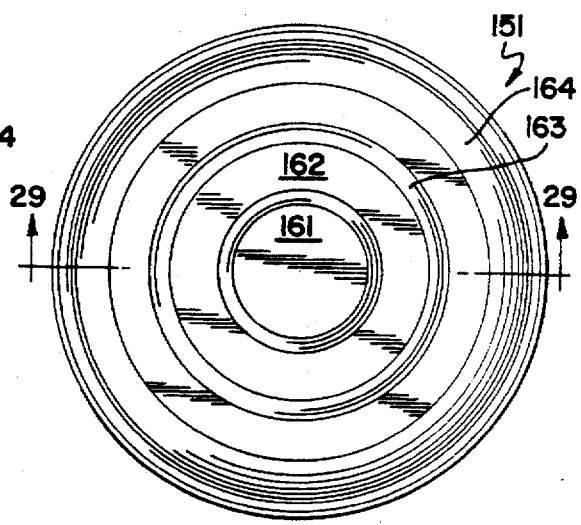
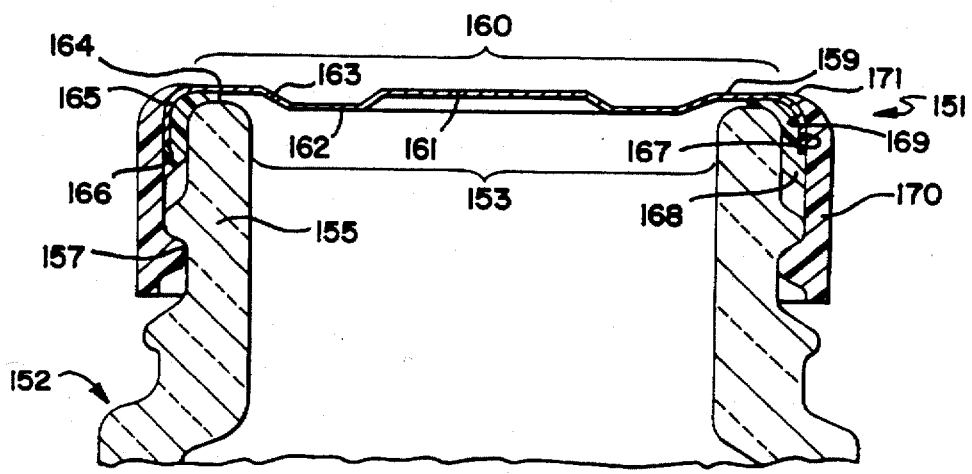

COMPOSITE CLOSURE AND METHOD OF MAKING SAME

The present invention relates in general to new and useful improvements in closure caps for glass and plastic containers and to a method of making the same and, more particularly, to an improved composite closure having a preformed end panel member around which a plastic skirt is molded. In this regard, an important aspect of the present invention is directed to an improved composite closure cap which includes a preformed metal or plastic end panel member around which both a plastic skirt and gasket are molded. The closure cap can also include a tamper indicating band which, in a preferred embodiment, is integral to and simultaneously molded with the skirt and has a foldable configuration designed to provide enhanced integrity of the frangible bridges, both during formation of the skirt and band and also during application of the closure to a container.

Composite closures having tamper indicating features are well known in the prior art and have been commonly used for a wide variety of products including, for example, baby food products and preserves, which are either hot-filled or are thermally pasteurized or sterilized after filling and closing. Typically, these closures include a metal panel which is prelined with a plastisol gasket material and inserted or pressed into a preformed plastic (e.g. polypropylene) skirt. A tamper indicating band, typically formed of a plastic material, is commonly secured to the lower portion of the skirt by a mechanical interlock which typically involves separate formation and assembly steps.

PT versions of these closures (i.e. those enabling press-on or non-rotary application to a container but requiring rotational removal) are commonly lined with a conventional plastisol gasket compound that is arranged to be in sealing engagement with the top edge or finish of the container and along the neck portion thereof. When first formed, these liners have a cylindrical bore which is adapted to provide an interference fit with the screw thread on the container neck, thereby enabling closure to be directly applied to the container without requiring rotation thereof. During thermal processing of the container after the filling and capping thereof, this lining takes a set by which it permanently conforms to the containers helical thread(s) for subsequent rotational removal of the closure by the user.

One such prior art closure is shown in U.S. Pat. No. 5,190,177. The closure cap of this patent includes a metal shell having a skirt portion which extends into a free edge formed by an in-turned curl at the end of the skirt. A separately formed plastic tamper band at its upper end is provided with an enlarged annular top portion that is held captive by a mechanical interlock with the terminal portion of the metal skirt.

While these prior art composite closures have provided satisfactory container sealing properties, they have been characterized by multiple manufacturing steps for individual components thereof, separate assembly steps and, in some instances further processing of one or more components in order to provide the desired mechanical interlock to the tamper band.

The present invention overcomes the problems and disadvantages of these prior art closures by providing a novel composite closure having a top panel or shell, preferably formed of metal, around which an integral plastic, preferably polypropylene, skirt is molded in surrounding and capturing relationship therewith. In a preferred embodiment, the upper portion of the plastic skirt terminates at approximately the stacking panel radius of the top panel. A gasket, preferably of a side seal type and composed of a thermoplastic elastomer can be formed by molding the same simultaneously with the molding of the skirt or, depending upon configuration of the end panel or shell and skirt, either prior to, or after molding of the skirt.

In accordance with an important aspect of this invention, the interior of the skirt includes preformed threads which are preferably of a multiple-lead configuration. Due to the flexibility of the skirt, these preformed threads will readily slide over the threaded portion of a container neck, enabling press-on or non-rotary, axial application of the closure to the container but which, at the same time, require rotational removal thereof. In some instances, a limited rotational twist or cinching after such axial application may be utilized to effect the desired sealing of the container.

An integral tamper indicating band extends downwardly from the lower portion of the skirt and can be formed by selectively slitting the bottom portion of the skirt to define a plurality of frangible bridges or, alternatively, by the formation of such bridges during the molding operation. In accordance with a further important aspect of the present invention, the band can include an upper portion joined to the skirt by a plurality of circumferentially disposed frangible bridges and a lower portion hingedly connected to said upper portion. The lower portion of the band has an axial length greater than the upper band portion so that when the closure is applied to a container, the bottom end of the lower band portion extends radially inwardly and axially upwardly for engagement with a retainer bead on the container at a location above the circumferentially disposed frangible bridges. In this manner, premature or inadvertent rupturing of the bridges is avoided both during the formation of the band (machine folding thereof) and also during application of the closure to a container.

It is, therefore, a general object of the present invention to provide a new and improved composite closure cap and method of making the same.

Another object of the present invention is to provide a novel composite closure cap having a metal end panel and a plastic skirt wherein the skirt is molded in surrounding and capturing relation to the end panel with a central portion of said end panel being exposed or free of plastic.

Another object of the present invention is to provide a novel composite closure wherein a plastic skirt is injection molded around a preformed oxygen barrier plastic end panel.

Another object of the present invention is to provide a novel composite closure wherein both a plastic skirt and gasket are molded around a preformed metal or plastic end panel or shell.

Another object of the present invention is to provide a novel composite closure having an injection molded skirt with preformed threads therein, which skirt is sufficiently flexible to permit direct axial and non-rotating application of the closure to a container during the filling and capping of the container but which requires twisting or rotational action for removal of the closure from the container.

Another object of the present invention is to provide a novel PT closure having a metal top panel or shell around which a skirt and integrally formed tamper indicating band are molded.

Another object of the present invention is to provide an improved foldable tamper—indicating band that is designed to minimize, if not totally avoid, inadvertent rupturing of the frangible bridges interconnecting the band to the bottom of a plastic skirt on a closure cap.

Another object of the present invention is to provide an improved composite closure having an end panel member formed of metal to which a generally cylindrical plastic skirt is molded in surrounding and capturing relation therewith wherein corrosion of the free edge of the end panel member is prevented by encapsulating the same within at least one of a gasket or said molded plastic skirt.

Another object of the present invention is to provide an improved composite closure having an end panel member to which a plastic skirt is molded in surrounding and capturing relation wherein the free edge of the terminal portion of the end panel is encapsulated between said plastic skirt and a molded gasket.

Another object of the present invention is to provide an improved composite closure exhibiting improved top impact resistance.

Another object of the present invention is to provide an improved composite closure exhibiting improved side impact resistance.

Another object of the present invention is to provide an improved composite closure having a metal end panel and a plastic skirt formed by molding the same in surrounding and capturing relationship therewith and an in-situ molded gasket which, upon application of said closure to a container, will move in an axially downwardly direction to provide an improved side seal with the outer surface of the neck portion of said container.

Another object of the present invention is to provide an improved composite closure having a gasket configuration which includes an upper end portion that terminates outwardly of the end surface of a container finish whereby migration of contaminants through the gasket to the contents of the container is minimized.

These and other objects of the present invention will be apparent from the following detailed description taken in conjunction with the accompanying drawings wherein like reference numerals refer to like parts and in which:

FIG. 8 is a bottom end view of the closure cap shown in FIGS. 1-6;

FIG. 9 is a sectional view taken along the line 9—9 of the closure cap shown in FIG. 1;

FIG. 10 is a fragmentary sectional view showing the tamper indicating band of the present invention as applied to a container and also illustrating, in phantom lower band travel during manufacturing process;

FIG. 13 is a schematic view of the dual station mold shown in FIGS. 11 and 12 illustrating the formation of a skirt in surrounding and capturing relation to the end panel and gasket of the closure;

FIG. 14 is a schematic view like that shown in FIGS. 11-13 with the mold components separated showing the ejection of a finished closure;

FIG. 18 is an exploded perspective view like that of FIG. 15 showing another embodiment of a composite closure of the present invention;

FIG. 19 is a top plan view of the closure shown in FIG. 18;

FIG. 20 is a sectional view taken along the line 20—20 of FIG. 19;

FIG. 21 is an exploded perspective view like FIGS. 15 and 18 showing a further embodiment of a composite closure of the present invention;

FIG. 22 is a top plan view of the closure shown in FIG. 21;

FIG. 23 is a sectional view taken along the line 23—23 of FIG. 22;

FIG. 24 is an exploded perspective view like FIGS. 15, 18 and 21 showing a composite closure in accordance with a still further embodiment to the present invention;

FIG. 25 is a top plan view of the closure shown in FIG. 24;

FIG. 26 is a sectional view taken along the line 26—26 of FIG. 25;

FIG. 27 is an exploded perspective view like FIGS. 15, 18, 21 and 24 showing a composite closure in accordance with a yet further embodiment of the present invention;

FIG. 28 is a top plan view of the closure shown in FIG. 27; and,

FIG. 29 is a sectional view taken along the line 29—29 of FIG. 28.

Figure 1:
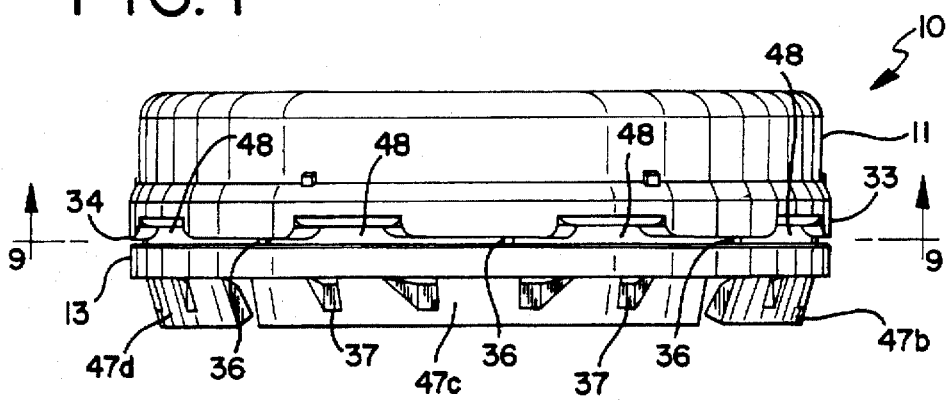
FIG. 1 is an elevational view of a composite closure in accordance with one embodiment of the present invention showing the details of the exterior skirt and tamper indicating band.
Figure 2:
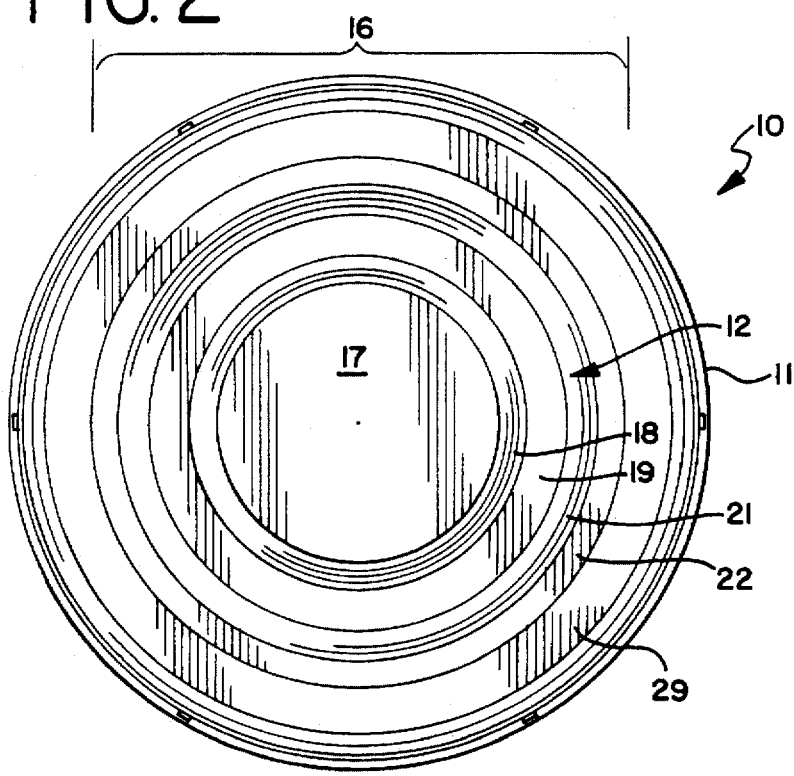
FIG. 2 is a top plan view of the closure shown in FIG. 1.
Figure 3:
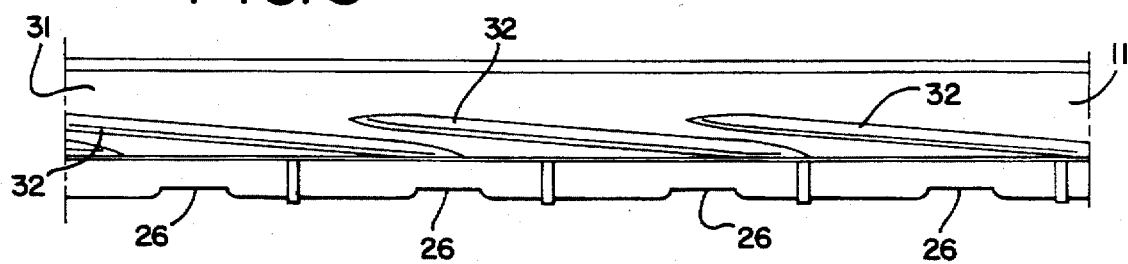
FIG. 3 is a partial side view of the interior of the closure cap shown in FIGS. 1 and 2 illustrating the multiple-lead preformed threads in the skirt portion thereof.

Referring to the drawings and with particular reference to FIGS. 1-10, a composite closure cap embodying the present invention is generally designated by the reference number 10. As shown, closure cap 10 includes a plastic skirt 11, an end panel member 12, a tamper indicating band 13 integrally formed with the skirt 11, and a gasket 14.

Figure 4:
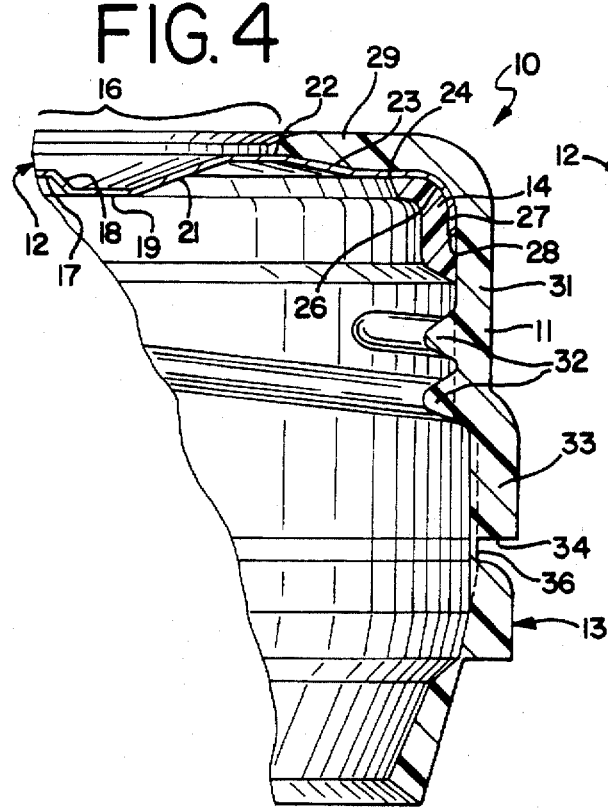
FIG. 4 is a vertical sectional view illustrating the closure of FIGS. 1-3 as formed and prior to the application of said closure cap to a container.
Figure 5:
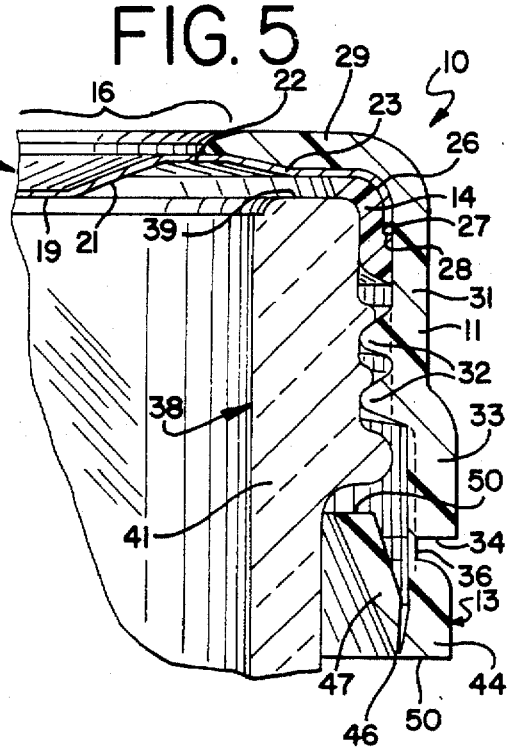
FIG. 5 is a vertical sectional view similar to FIG. 4 but showing the closure cap as applied to a container prior to the creation of a vacuum condition in said container.
Figure 6:
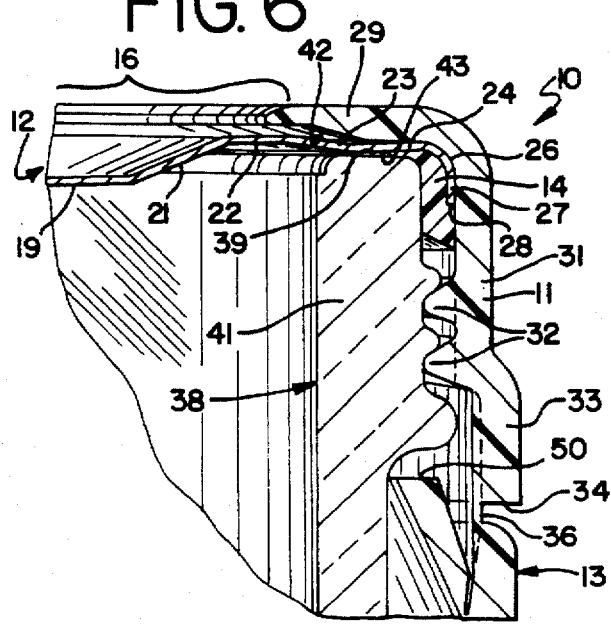
FIG. 6 is a view similar to FIG. 5 but showing the axial spacing between the upper annular flange of the skirt and the portion of the metal end panel underlying the same after the creation of a vacuum condition in the container.
Figure 7:
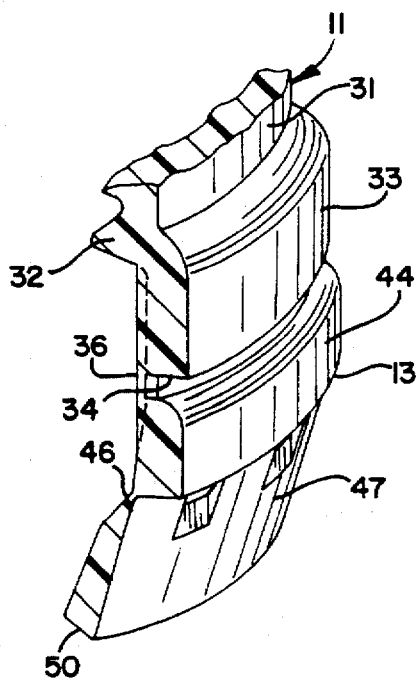
FIG. 7 is a fragmentary perspective of the plastic skirt of FIGS. 1-6 showing the tamper indicating band thereof in its molded position.

End panel 12 is preferably formed of metal, however, other materials exhibiting suitable oxygen barrier properties can also be used such as, for example, appropriately formulated Saran type materials (vinyl chloride-vinylidene chloride copolymers), nylons and other thermoplastic and thermoset resins and composite structures known in the art. As best shown in FIGS. 4-6, end panel member 12 in the illustrated embodiment includes a central portion 16, the radial innermost portion of which includes an upwardly projecting button 17 which sequentially extends radially outwardly into a downwardly and outwardly inclined flange 18, a flat 19, an upwardly and outwardly inclined flange 21, annular flat 22, a downwardly and radially outwardly inclined flange 23, a radially extending annular flat 24, a downwardly curved section 26 and a radially and axially downwardly extending section 27 which terminates in a free or cut edge 28. As is known in the art, the creation of a vacuum condition in the container to which the closure is applied will result in the downward axial movement and depression of the panel and button 17 while release of the vacuum will cause the panel and button to return to their as—formed position shown in FIG. 4.

In the illustrated embodiment, plastic skirt 11 includes an upper radially inwardly extending flange 29 which overlies the outer periphery of the end panel member and extends axially downwardly into a sidewall 31 the inner circumferential surface of which is provided with a plurality of preformed threads 32 and from there into an enlarged axially downwardly extending cylindrical section 33, the terminal portion 34 of which is integrally connected to tamper band 13 by means of a plurality of circumferentially disposed fracturable bridges 36. A plurality of drain holes 37 can be provided for facilitating the discharge of moisture during the processing of a container to which the closure cap has been applied.

In accordance with an important aspect of this invention, skirt 11 is formed by molding the same in surrounding and capturing relation to the end panel member 12 in a manner by which the central portion of the end panel member 12 is exposed, that is free of any overlying plastic material. Any suitable molding technique such as insert injection molding, which permits the formation of the skirt in this surrounding and capturing relation to end panel 12, can be employed. The skirt 11 can be suitably formed from any thermoplastic or thermoset resin, however, homopolymers, copolymers and terpolymers of ethylene and/or propylene are generally preferred with polypropylene being especially preferred.

In accordance with a further important aspect of the present invention, gasket 14 is of a side seal type and is also formed by molding. Gasket 14 can be formed of any resilient or elastomeric materials (i.e. thermo-plastic, thermoset and plastisol compositions) which provide the desired seal with the finish of a container. In this regard, however, vinyl chloride-free resins or non-PVC materials are preferred.

These non-PVC materials include rubbery block copolymers dispersed in a matrix of polyolefin as a continuous phase with moldable thermoplastic elastomers being especially preferred since they possess a number of processing advantages and can be used with little or no extra compounding, vulcanization or heating steps. For example, gasket compositions composed of a thermoplastic elastomeric material selected from a moldable, saturated ABA type block copolymers based on styrene and butadiene such as styrene-ethylene-butylene-styrene (SEBS) type block copolymers containing from about 20% to about 40% styrene and 60% to 80% ethylene-butylene co-monomers, such as Kraton® G-2705 available from Shell Chemical Corporation, can be effectively used. Preferred thermoplastic elastomers include the EPDM (ethylene-propylene-dicyclopentadiene) elastomers such as those commercially available under the trade name Santoprene® from Monsanto Company. If desired, suitable additives to facilitate torque release and other beneficial properties can be used in these gasket compositions.

As best shown in FIGS. 5 and 6, when the closure cap of this embodiment is applied to a container 38 having an end surface 39 and a neck 41, the gasket will primarily provide a side seal. In this regard, it will be noted that gasket 14 includes an upper annular flange which extends radially inwardly over only a limited portion of the end surface 39.

As such, migration of contaminants through the gasket to product contained within the container 38 is minimized, if not totally eliminated.

In accordance with an important aspect of the present invention, the free end or cut edge 28 of end panel member 12, is encapsulated. For example, in the illustrated embodiment, cut edge 28 is encapsulated between the gasket 14 and molded plastic skirt 11. As will be observed with other embodiments of the present invention, however, the cut edge 28 optionally can be encapsulated entirely within the gasket 14 or entirely within the plastic skirt 11. All of these arrangements provide the desired corrosion prevention of the free end or cut edge.

Closure caps of the present invention also exhibit important and beneficial impact resistance to axial and radial forces which may be applied to the container during handling, warehousing, stacking and the like. This resistance to axially applied forces is best illustrated by referring to FIGS. 5 and 6. As shown, the annular flange portion 29 of skirt 11 extends over the outer periphery of the end panel member and terminates at a location adjacent the stacking panel radius of the closure. Prior to the formation of a vacuum in the container 38 as depicted by FIG. 5, the lower portion of flange 29 is in direct contact with the upper portion of the metal end panel underlying the same. Since there is very little, if any, adhesion or bonding between the bottom surface of that flange and the metal panel, however, the creation of a vacuum in container 38 results in the downward axial travel of the end panel to provide a spaced-away relationship between that flange portion and the upper surface of the panel as is generally designated by the reference numeral 42 in FIG. 6. In this manner, the inherent resiliency of the flange 29 enables it to function as a shock-absorbing member with substantially reduced transmission of axial forces to the end panel, such forces being directed to the sidewall 31 of the skirt. This axial shock absorbing advantage is further enhanced by the presence of an axial gap or space 43 between the lower surface of the outer periphery of the end panel which overlies the end surface 39 of the container as also shown in FIG. 6. Accordingly, unlike conventional side seal closures wherein there is a metal to glass contact, this panel to end surface axial spacing further enhances the transfer of axially imparted forces through the gasket to the exteriorly located plastic skirt, thereby resulting in the distribution of such forces around the periphery of the closure and minimizing leakage caused by such axial forces.

In accordance with a still further aspect of the present invention, gasket 14 (when composed of a thermoplastic elastomer), will have a substantially stronger bond to the plastic skirt portions which are in contact therewith than is present between the gasket and the metal portion of the end panel. Since the thermoplastic elastomer gasket, while resilient, is relatively non-compressible in comparison to a gasket of a foamed or puffed plastisol, application of the closure cap to a container results in a movement of the gasket in axially upward and downward directions, thereby providing an enhanced side seal with the outer surface of the neck portion 41. If desired, the bond or adhesion between the thermoplastic gasket and the metal disk can be increased by preheating the metal disk or applying an adhesion-enhancing coating thereto.

Referring now to FIGS. 1 and 7–10, the tamper indicating band 13 is shown to include an upper portion 44 hingedly connected at 46 to a lower band portion 47. The lower band portion 47 is, in accordance with a preferred embodiment, defined by a plurality of individual separate band segments 47a, 47b, 47c and 47d. If desired, washout apertures 48 between the terminal edge portion of skirt 11 and the upper portion band 44 can be provided for passage of moisture and liquids into the space between the interior of the skirt and the container neck.

As best shown in FIG. 10, the upper portion 44 of the tamper indicating band is joined to the skirt by the bridges 36 at a location below a container retainer bead 49. In accordance with a further and preferred aspect of the present invention, the axial length of the lower band portion 47 (47b in the portion shown in FIG. 10) is greater than the axial length of the upper band portion 44. In this manner, when the closure is applied to a container, the terminal portion 50 of the lower band 47 extends radially inwardly and axially upwardly for engagement with the retainer bead 49 at a location above the circumferentially disposed bridges 36. The tamper band 13 thereby provides enhanced integrity of the frangible bridges and inadvertent rupturing thereof is minimized, if not totally avoided, both during the formation of the band (i.e. machine folding thereof) and also during application of the closure to a container.

While the improved tamper band of the present invention is shown and described in association with the improved composite closure of this invention wherein a plastic skirt is molded in surrounding and capturing relation to an end panel, it will be appreciated that the advantageous enhanced bridge integrity achievable therewith can likewise be suitably employed in other closures such as, for example, those shown in co-owned U.S. Pat. No. 4,981,230 which describes and claims a composite plastisol-lined metal and plastic closure having a metal shell that includes a skirt, the end portion of which is provided with an outward curl that is secured to and received within a plastic overcap. Accordingly, it will be appreciated that the benefits and advantages of the tamper indicating band feature of this invention can find suitable application to a variety of other composite closure caps as well as closure caps having a unitary top and sidewall skirt formed entirely of plastic.

Correspondingly, it should also be noted that the closure caps embodying the previously-described novel skirt molding feature of the present invention can incorporate integral tamper bands having a lower band portion 47 with a terminal portion 50 which is at the same elevation as, or below, the frangible bridges 36. Alternatively, if desired, the tamper band can be eliminated in its entirety or a tamper band having a configuration other than that shown in FIGS. 1–10 used in-place thereof.

The closure shown in FIGS. 1–10 can be manufactured by a variety of molding procedures which achieve the desired formation of a plastic skirt in surrounding and capturing relation to a preformed end panel or disk. For example, these closures can be manufactured by insert injection procedures as well as other molding procedures and techniques apparent to those skilled in this art.

A suitable procedure for manufacture of these closures is illustrated by the sequential steps shown in FIGS. 11–14 which generally depict a two-stage process wherein the gasket is insert molded to the disk in a first station followed by molding of the plastic skirt to the end panel and gasket in a second station. If desired, however, the gasket can be separately formed and inserted into a previously formed partial closure (i.e. one including only the end panel and molded skirt). It will also be appreciated that, depending upon the configuration of the individual components of these closures, the gasket may be molded simultaneously with, or subsequently to, the molding of the skirt.

Referring to FIGS. 11–14, the reference numeral 60 generally designates an injection molding apparatus which includes an upper mold component 61 which includes a first cavity 62 and a second cavity 63. A lower mold component 64 is also provided and includes first and second members 65 and 66 which are moveable as a unit for alignment of a core 67 carried by member 66 into appropriate registration with each of the cavities 62 and 63. Lower mold member 64 is adapted to slidably travel along a base member 68 which includes a knockout piston or cylinder 71 for ejection of the finished closure.

First cavity 62 is supplied with melt suitable for forming the gasket 14 of the closure via a melt supply chamber 69 and gate 70. A poppet 72 can be provided in cavity 62 for ensuring transfer of the partially formed closure from the first station (cavity 62) to the second molding station (cavity 63). Cavity 63 is supplied with a melt suitable for forming the skirt 11 from a melt supply chamber 73 which feeds a gate 74 for discharge of the melt into the cavity 63. Knockout cylinder or piston 71, in association with telescoping actuating cylinders 76 and 77, effects separation of mold parts 65 and 66 to eject the finished closure.

Figure 11:
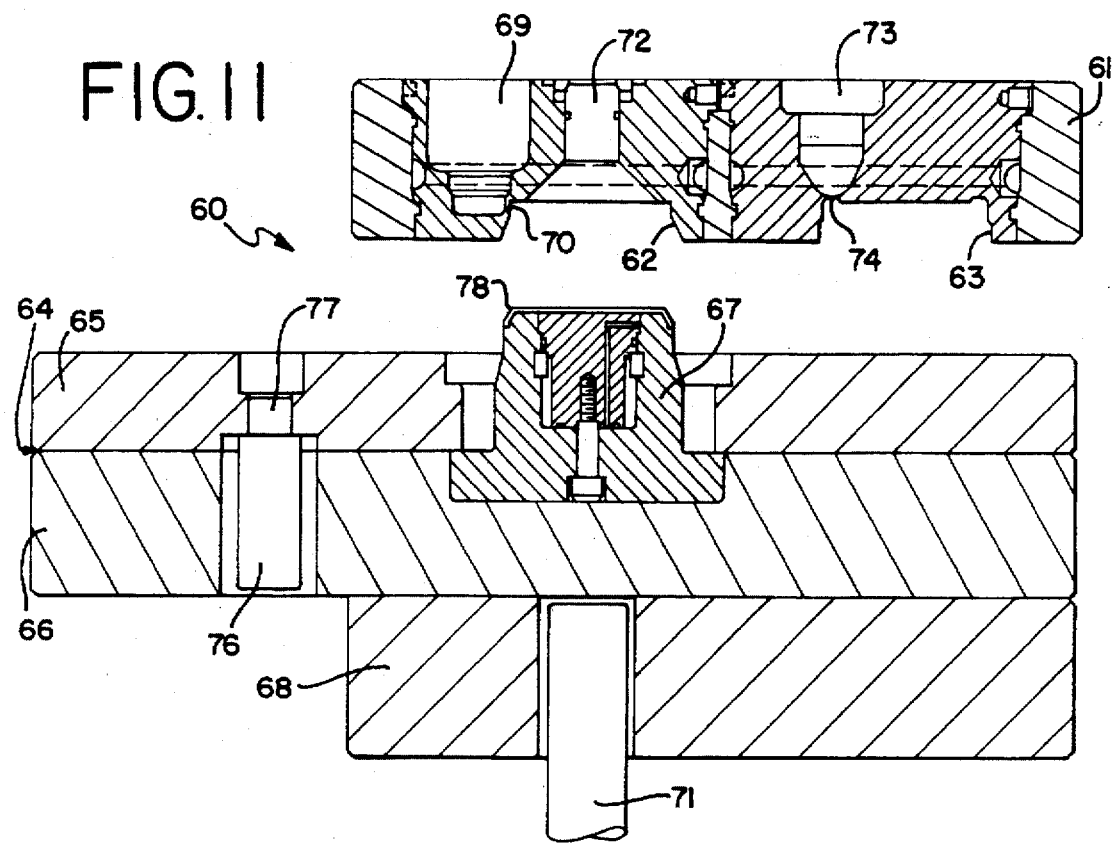
FIG. 11 is a schematic view of a dual station mold showing the upper and lower components thereof in an open position.
Figure 12:
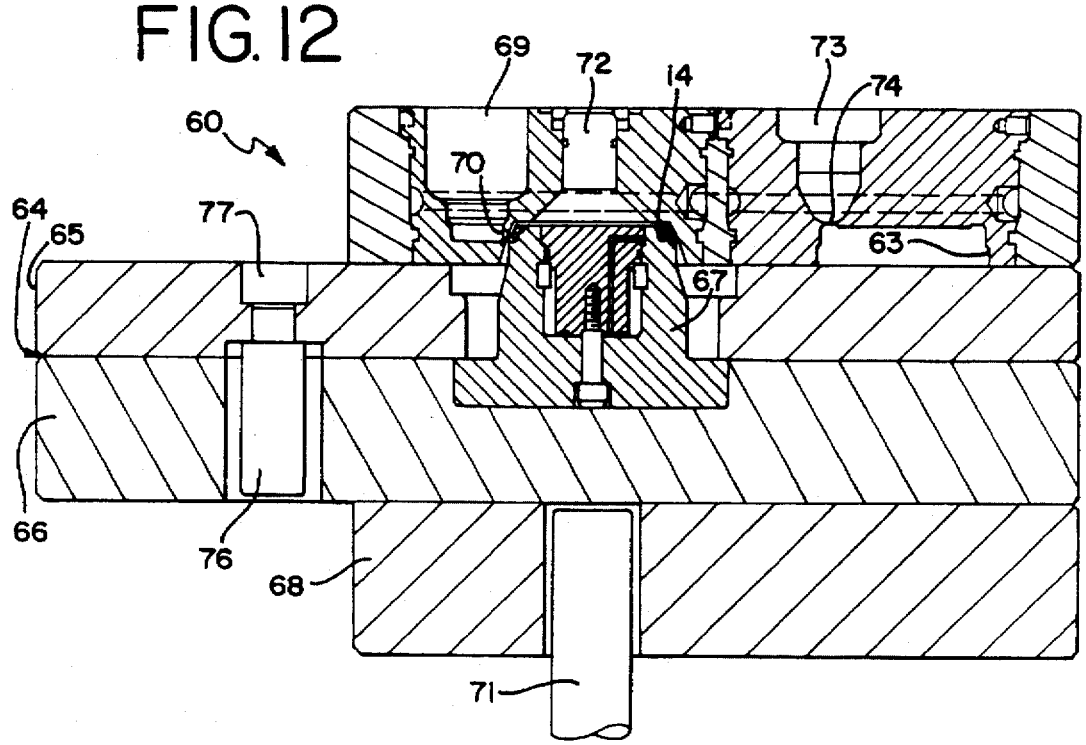
FIG. 12 is a schematic view of the dual station mold shown in FIG. 11 with the upper and lower components thereof in a closed position illustrating the formation of a gasket in the end panel of a closure in accordance with one aspect of the present invention.

As shown in FIG. 11, a preformed end panel member 78 is loaded on core 67 which, in the first stage of the molding procedure is in registration with cavity 62. Upper and lower mold components 61 and 64 are then brought into contact with each other as shown in FIG. 12 and gasket forming melt is supplied to the outer inner periphery of the end panel member 78. After completion of the gasket forming step, the mold is then opened and lower mold member 64 then moved along the base member 68 so that the core 67 with the partially formed closure is in appropriate registration with the second cavity 63. As shown in FIG. 13, the mold is then closed and the suitable skirt forming melt is injected into the skirt defining mold cavity formed by the mold components and the end panel and gasket from the first stage of the molding sequence.

Upon completion of the formation of the skirt in surrounding and capturing relation to the end panel, the mold is then opened and knockout piston or cylinder 71 together with telescoping cylinders 76 and 77 operated to effect separation of mold member 65 and 66 for ejection of the finished closure 10 as shown in FIG. 14.

The foregoing description is set forth for illustrative purposes and merely represents one procedure by which closures of the present invention may be manufactured. Variations from this procedure will be readily apparent. For example, while the end panel member 78 when loaded on core 67 as shown in FIG. 11 can be fully shaped in accordance with its final configuration, it is also possible to effect further shaping thereof in the first stage of the molding procedure. Additionally, while the procedure as described shows the initial formation of the gasket and subsequent formation of the skirt, alternate configurations of the skirt and gasket may more suitably be manufactured by initial formation of the plastic skirt followed by panel insertion and then formation of the gasket. In some instances, formation of only the plastic skirt via molding may be utilized followed by subsequent insertion of a preformed gasket into the thus formed end panel and skirt. Correspondingly, if desired, the gasket can be molded in a first station, followed by insertion of the end panel member into the thus molded gasket in a second station, and then molding of the skirt around the gasket and end panel member in a third station.

Figure 15:
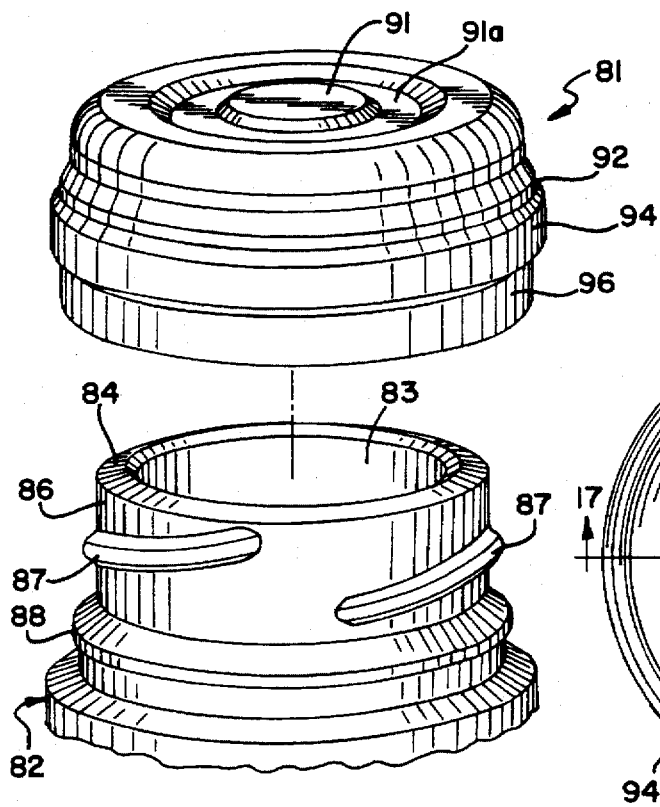
FIG. 15 is an exploded perspective view of a composite lug closure embodying the present invention as seen in relation to the neck of a glass container of a food product to which the closure is fitted.
Figure 16:
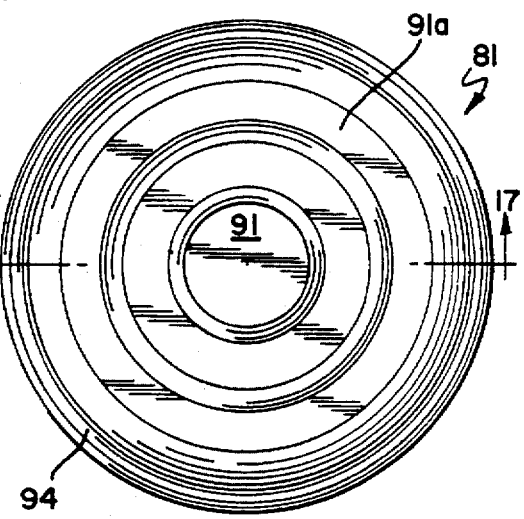
FIG. 16 is a top plan view of the closure shown in FIG. 15.
Figure 17:
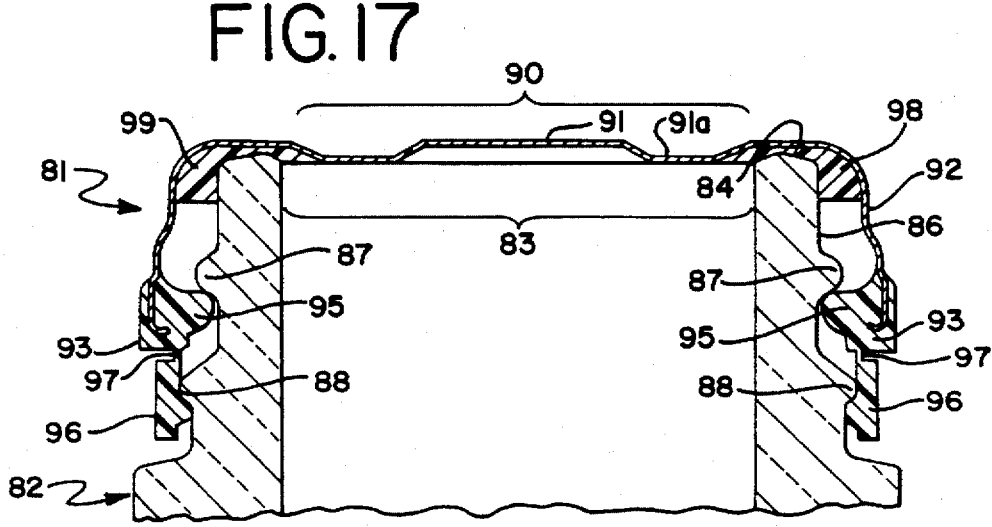
FIG. 17 is a sectional view taken along the line 17—17 of FIG. 16.

Referring now to FIGS. 15–17, an alternate embodiment of the present invention is shown in the form of a lug type closure cap generally designated by the reference numeral 81 which is in overlying relation to a container 82 having an open mouth 83 defined by an end face 84 and neck portion 86. In this embodiment, neck portion 86 is provided with sequentially arranged partial threads 87 which are intended for cooperative mating engagement with plurality of lug projections 95 on the closure 81. A retaining bead 88 is provided for cooperative intersection with a tamper band.

Closure cap 81 includes a metal end panel having a central portion 90 adapted to overlie the mouth 83 of container 82. As shown, central portion 90 of the end panel includes a generally centrally located upwardly projecting button 91 which extends sequentially radially outwardly into a flat 91a, a gasket-receiving channel 99, and a generally cylindrical sidewall portion 92 that terminates in an inwardly curled end portion 93 which is encapsulated within a molded plastic skirt 94 having a plurality of integrally formed lugs 95 that cooperate with the threads 87. A drop down tamper indicating band 96 is integrally formed with and connected to the skirt 93 by means of a plurality of fracturable bridges 97. As shown, tamper indicating band includes an inwardly projecting flange sized and spaced to engage with retainer bead 88 of container 82 during closure removal to facilitate detachment of the band 96 from the body of the skirt. As best shown in FIG. 17, a gasket 98 is provided in the channel 99 located on the interior of the outer periphery of closure cap 81 and provides both a side and top seal with the outer surface of neck portion 83 as well as with the end face 84 thereof. Gasket 98 can be formed of any suitable elastomeric material which effects the desired sealing relationship with the upper portion of the cylindrical neck surface 86 and the end face 84 thereof. Suitable gasket materials include the aforementioned thermoplastic elastomers which desirably can be molded during the formation of the cap or conventional gasket materials such as, for example, plastisols which are deposited into the channel 94.

Referring to FIGS. 18–20, a PT closure cap 101 is depicted in overlying relationship to a container 102 having a neck portion 103 and a plurality of multiple lead helical threads 104 circumferentially disposed around the outer portion of the neck in overlying relation to a retainer bead 105. Container neck 103 terminates in an end surface 106 which, together with the neck portion defines an open mouth 107.

Referring to FIG. 20, it will be noted that the closure cap 101 includes a generally cup-shaped shell 108 having a central portion 109 adapted to overlie the mouth 107 of container 102. The central portion 109 of shell 108 extends downwardly into a cylindrical sidewall portion 110 terminating in an outwardly turned end portion 111 which, in accordance with an important aspect of the present invention is encapsulated within the molded skirt 112. Interiorly of the sidewall portion 110 is a molded gasket 110a which forms a side seal with the container neck portion 103. A plurality of preformed threads 113 are provided on the interiors cylindrical surface of skirt 112 for cooperative engagement with the threads 104 in the container neck. Again, as previously noted, a tamper indicating band 114 integrally formed with and connected with the skirt 112 by a plurality of bridges 115 is provided. The tamper indicating band includes an axially upwardly and radially inward end portion 116 adapted to engage retainer bead 105 during removable for facilitating the rupturing of the frangible bridges and detachment of the band 114 from the main body of the skirt.

FIGS. 21–23 illustrates a further embodiment of a PT closure 121 embodying the present invention. As best shown in FIGS. 21 and 23, closure cap 121 is depicted in overlying relation to a container similar in construction to that previously described in connection with FIG. 18.

Closure cap 121 includes a disk shaped end panel 123 which extends radially outwardly as is captured by a skirt 124 and a gasket 125. The outer peripheral cut edge of end panel 123 is encapsulated between the inner surface 126 of a radially inwardly extending flange 127 on the skirt 124 and the upper surface 128 of the gasket 125.

As shown, the gasket 125 includes an integral radially extending upper portion which terminates at a location on the inner surface of panel 123 which is radially outward of the inner periphery of the end face 106 so as to minimize migration of contaminants through the gasket into the interior of the container 102. As will be appreciated gasket 125, while providing sealing with the outer portion of the edge surface 106 is primarily of a side seal type with the interior surface 129 of such gasket being in direct sealing engagement with the upper outer cylindrical surface of neck 103.

If desired, the outer surface 131 of skirt 124 can be provided with a plurality of outer circumferentially disposed axially extending ribs 132 for facilitating grasping and removal of the closure cap. Correspondingly, the inner cylindrical surface of skirt sidewall 131 includes a plurality of internal threads 130 formed during the molding thereof which are adapted to matingly engaged with threads 104 on the outer surface of the neck.

FIGS. 24–26 illustrate still yet a further embodiment of PT closure cap embodying the present invention which is generally designated by the reference numeral 135. As best shown in FIG. 26, closure cap 135 includes an end panel member 136 formed of metal having a central panel portion 137 that overlies the mouth of a container 107. End panel member 136 is provided with a button 138 which extends radially outwardly into an upwardly extending flange 139 and from said flange into an annular rim 140 which, in turn, extends into an arcuate rim 141 that terminates in an axially downwardly extending end face 142 that is encapsulated entirely within a gasket 143 which, preferably, is formed by molding. As shown, the closure cap 135 includes a skirt 144 formed by molding the same in surrounding relationship to both the end panel member 136 and gasket 143. Skirt 144 includes an upper radially inwardly extending flange 145 which extends into a cylindrical sidewall 146 having an outer surface on which a plurality of circumferentially disposed axial ribs 147 are provided. The inner surface of the skirt sidewall 146 is provided with a plurality of preformed threads 148 which are adapted to be slidably received over the threads 104 on the container neck to facilitate press-on or non-rotary application of the closure cap to the container. If desired, the lowermost end portion of the skirt 144 can be provided with an integrally formed tamper indicating band 149 which is connected thereto by means of a plurality of frangible bridges 150 which can be formed by molding or slitting.

Referring now to FIGS. 27–29, an alternate embodiment of the present invention is shown in the form of a press-on, pry off closure cap generally depicted by the reference numeral 151 which is in overlying relation to a container 152 having an open mouth 153 defined by an end face 154 and a neck portion 155. As shown, a circumferential, radially outwardly extending bead 156 is provided for cooperative interaction with a radially inwardly extending bead 157 in the closure cap 151 so as to effect securement of the closure cap 151 to the container neck 155. If desired, a retainer bead 158 can be provided on the container neck portion 156 for interaction in a known manner with a tamper indicating band (not shown).

Closure cap 151 includes a metal end panel 159 having a central portion 160 which is adapted to overlie the mouth 153 of container 152. As shown, central portion 160 of the end panel includes a generally centrally located upwardly extending button 161 which extends sequentially radially outwardly into an annular flat 162, an upwardly and radially outwardly extending flange 163, an annular rim 164, an arcuate and downwardly extending section 165 and an axially downwardly extending cut edge 166. As shown, the arcuate section 165 and cut edge 166 are encapsulated between the outer periphery 167 of a gasket 168 and the upper inner periphery 169 of the skirt 170 of closure cap 151.

In this illustrated embodiment, the upper end of skirt 170 terminates in a radially extending partial flange 171 which overlies only the outermost portion of annular rim 164 and the arcuate section 165 of metal end panel 159. If desired, however, upper flange 171 of skirt 170 can be sized to extend over a substantial portion of annular rim 164 in a fashion similar to that shown in the previously described embodiments.

Gasket 168 can be formed of any suitable elastomeric material which effects the desired sealing relationship with the upper portion of the neck surface 155 and end face 154. Suitable gasket materials include the aforementioned thermoplastic elastomers which desirably can be molded during the formation of the cap or conventional gasket materials such as, for example, plastisols The present invention has been described in the context of a number of embodiments. It will be apparent to those skilled in this art, however, that modifications and variations therefrom can be made without departing from the spirit and scope of this invention. Accordingly, this invention is to be construed and limited only by the scope of the appended claims.

We claim:

1. A composite closure, said closure comprising: an end panel member having a central portion sized and positioned to overlie a mouth of a container to which said closure is applied, said container mouth being defined by a generally cylindrical neck portion, said end panel member having an upper surface and a lower surface and extending into a free edge at a peripheral portion thereof, said peripheral portion including an inner surface and an outer surface adjacent to said free edge, a generally cylindrical plastic skirt molded in surrounding and capturing relation to said end panel to provide said skirt and end panel with a unitary construction with a least a part of the upper and lower surfaces of said central portion being free of plastic, a gasket within said closure, said gasket being engageable with said neck portion of said container to provide a seal therewith, and said free edge and the inner and outer surfaces of said peripheral portion adjacent thereto being fully encapsulated by an least one of said gasket and said molded plastic skirt.

2. The closure of claim 1 wherein said free edge of said end panel member is encapsulated between said skirt and gasket.

3. The closure of claim 1 wherein said free edge of said end panel member is encapsulated within said skirt.

4. The closure of claim 1 wherein said free edge of said end panel member is encapsulated within said gasket.

5. The closure of claim 1 wherein said gasket is formed by molding the same to at least one of said end panel member and said skirt.

6. The closure of claim 1 wherein said gasket is formed by molding same to said end panel.

7. The closure of claim 1 wherein said end panel member is formed of metal.

8. The closure of claim 1 wherein said end panel is formed of an oxygen barrier plastic.

9. The closure of claim 1 wherein said skirt is formed of a thermoplastic resin.

10. The closure of claim 1 wherein said skirt is formed of a thermoset resin.

11. The closure of claim 1 wherein said skirt is formed of a polyolefin.

12. The closure of claim 1 wherein said skirt is formed of polypropylene.

13. The closure of claim 1 wherein said plastic skirt includes an upper annular flange which extends inwardly of and over an outer periphery of the central portion of said end panel member.

14. The closure of claim 13 wherein, when a vacuum condition is maintained in a container to which said closure has been applied, the said upper annular flange of said skirt is in axially spaced-away relation to an upper surface of the outer periphery of the central portion of said end panel member which it overlies.

15. The closure of claim 1 wherein said gasket is composed of a moldable resin which is substantially free of vinyl chloride.

16. The closure of claim 1 wherein said gasket is composed of a thermoplastic elastomer.

17. The closure of claim 1 wherein, when said closure is applied to a container, a radial inwardmost portion of an upper portion of said gasket in contact with an outer periphery of the inner surface of said central portion of the end panel member terminates at a location which is radially outward of at least the radially inwardmost portion of the end surface of the container neck portion defining said mouth whereby migration of contaminants through said gasket to the contents of the container is minimized.

18. The closure of claim 17 wherein the radially inwardmost portion of the upper portion of said gasket terminates at a location which leaves the major portion of the end surface of said container neck portion substantially free of said gasket.

19. The closure of claim 1 wherein the portion of lower surface of the central portion of said end panel which overlies an end surface of the container neck portion defining said mouth is substantially free of gasket and in axially spaced-away relation to said end surface.

20. The closure of claim 1 wherein a tamper indicating band is integrally formed with and extends downwardly from a terminal edge of said skirt, said skirt including a plurality of circumferentially disposed apertures located above said tamper indicating band, said apertures being sized for passage of liquids into the space between the interior of the skirt and the neck of a container to which the closure has been applied.

21. The closure of claim 20 wherein said circumferentially disposed apertures are defined by the terminal edge of said skirt and the upper edge of said tamper indicating band.

22. The closure of claim 1 wherein said skirt includes a cylindrical tamper indicating band extending downwardly therefrom, said tamper band being integrally formed with said skirt and including an upper portion joined to said skirt by a plurality of circumferentially disposed fracturable bridges and a lower portion hingedly connected to said upper portion, said lower portion having an axial length greater than the axial length of said upper portion whereby, when said closure is applied to a container, said lower portion of said tamper indicating band extends radially inwardly and axially upwardly for engagement with a retainer bead on said container at a location above said circumferentially disposed fracturable bridges.

23. The closure of claim 22 wherein said skirt includes a plurality of circumferentially disposed apertures located above said tamper indicating band, said apertures being sized for passage of liquids into the space between the interior of the skirt and the neck of said container.

24. The closure of claim 23 wherein the lower portion of said tamper indicating band includes a plurality of circumferentially disposed drain holes.

25. The closure cap of claim 1 wherein said skirt includes at least one preformed helical thread positioned and sized for mating engagement with an external helical thread on the cylindrical neck portion of said container.

26. The closure cap of claim 1 wherein said tamper indicating band includes a preformed circumferential inwardly extending flange which is sized and positioned to be snap fitted over an external circumferential locking bead on the cylindrical neck portion of said container.

27. A composite closure, said closure comprising a metal end panel having a generally circular central portion sized and positioned to overlie a mouth of a container to which said closure is applied, said container mouth defined by a generally cylindrical neck portion which includes at least one external thread, said end panel having an upper surface and a lower surface and extending into a free edge at a peripheral portion thereof, said peripheral portion including an inner surface and an outer surface adjacent to said free edge, a generally cylindrical plastic skirt molded in surrounding and capturing relation to said end panel to provide said skirt and end panel with a unitary construction with at least a part of the upper surface of said central portion being exposed, said skirt including at least one preformed internal thread positioned and sized for mating engagement with said at least one external thread of said container neck, a gasket within said closure, said gasket having been formed by molding the same to at least one of said end panel and said skirt and being engageable with said neck portion of said container to provide a seal therewith, and said free edge and the inner and outer surfaces of said peripheral portion adjacent thereto being fully encapsulated by at least one of said gasket and said molded plastic skirt.

28. The closure of claim 27 wherein said free edge of said end panel member is encapsulated between said skirt and gasket.

29. The closure of claim 27 wherein said free edge of said end panel member is encapsulated entirely within said skirt.

30. The closure of claim 27 wherein said free edge of said end panel member is encapsulated entirely within said gasket.

31. The closure of claim 27 wherein said gasket is formed by molding the same to said end panel member.

32. The closure of claim 27 wherein said end panel is flexible and axially moveable from a seal indicating position to a non-seal indicating position.

33. The closure of claim 27 wherein said skirt is formed of a thermoplastic resin.

34. The closure of claim 27 wherein said skirt is formed of a moldable resin selected from the group consisting of homopolymers, copolymers and terpolymers of ethylene and propylene.

35. The closure of claim 27 wherein said skirt is formed of polypropylene.

36. The closure of claim 27 wherein said plastic skirt includes an upper annular flange which extends inwardly of and over an outer periphery of the central portion of said end panel member.

37. The closure of claim 36 wherein, when a vacuum condition is maintained in a container to which said closure has been applied, the said upper annular flange of said skirt is in axially spaced-away relation to the outer periphery of the upper surface of the central portion of said end panel which it overlies.

38. The closure of claim 27 wherein said gasket is composed of a moldable resin which is substantially free of vinyl chloride.

39. The closure of claim 27 wherein said gasket is composed of a thermoplastic elastomer.

40. The closure of claim 27 wherein when said closure is applied to a container a radial inwardmost portion of an upper portion of said gasket which is in contact with an outer periphery inner surface of the end panel terminates at a location which is radially outward of at least the radially inwardmost portion of the end surface of the container neck portion defining said mouth whereby migration of contaminants through said gasket to the contents of the container is minimized.

41. The closure of claim 40 wherein the radially inwardmost portion of the upper portion of said gasket terminates at a location which leaves the major portion of the end surface of said container neck portion substantially free of said gasket.

42. The closure of claim 27 wherein the portion of inner surface of a central portion of said end panel which overlies the end surface of the container neck portion defining said mouth is substantially free of gasket and in axially spaced-away relation to said end surface.

43. The closure of claim 27 wherein a tamper indicating band is integrally formed with and extends downwardly from a terminal edge of said skirt, said skirt including a plurality of circumferentially disposed apertures located above said tamper indicating band, said apertures being sized for passage of liquids into the space between the interior of the skirt and the neck of a container to which the closure has been applied.

44. The closure of claim 43 wherein said circumferentially disposed apertures are defined by the terminal edge of said skirt and the upper edge of said tamper indicating band.

45. The closure of claim 27 wherein said skirt includes a cylindrical tamper band extending downwardly therefrom, said tamper band being integrally formed with said skirt and including an upper portion joined to said skirt by a plurality of circumferentially disposed fracturable bridges and a lower portion hingedly connected to said upper portion, said lower portion having an axial length greater than the axial length of said upper portion whereby, when said closure is applied to a container, said lower portion of said tamper band extends radially inwardly and axially upwardly for engagement with a retainer bead on said container at a location above said circumferentially disposed fracturable bridges.

46. The closure of claim 45 wherein said skirt includes a plurality of circumferentially disposed apertures located above said tamper indicating band, said apertures being sized for passage of liquids into the space between the interior of the skirt and the neck of said container.

47. The closure of claim 46 wherein the lower portion of said tamper indicating band includes a plurality of circumferentially disposed drain holes.

48. A composite closure adapted for press-on application to and rotational removable from a container, said closure comprising: a metal end panel member having a generally circular central portion sized and positioned to overlie a mouth of a container to which said closure is applied, said container mouth being defined by generally cylindrical neck portion which includes at least one external thread, said end panel member having an upper surface and a lower surface extending into a free edge at a peripheral portion thereof, said peripheral portion including an inner surface and an outer surface adjacent no said free edge, a generally cylindrical flexible skirt composed of a flexible thermoplastic resin molded in surrounding and capturing relation to said end panel to provide said skirt and end panel with a unitary construction with at least of the upper and lower surfaces of said end panel, said skirt including at least one preformed internal thread positioned and sized for mating engagement with said at least one external thread of said container neck, said skirt and preformed internal thread having respective internal diameters which enable the press-on application of said closure to a container but which require rotational movement for removal of said closure from said container, said plastic skirt further including an upper annular flange which extends inwardly of and over an outer periphery of the central portion of said end panel member with at least a radial innermost portion of the outer surface of the central portion of said end panel member being exposed; a gasket within said closure, said gasket having been formed by molding the same to at least one of said end panel member and said skirt and being engageable with said neck portion of said container to provide a seal therewith; said free edge and the inner and outer surfaces of said peripheral portion adjacent thereto being fully encapsulated by at least one of said gasket and said molded plastic skirt and, a cylindrical tamper band extending downwardly from a lower portion of said skirt, said tamper band being fully integrally formed with said skirt and including an upper portion joined to said skirt by a plurality of circumferentially disposed fracturable bridges and a lower portion which extends radially inwardly and axially upwardly for engagement with a retainer bead on said container.

49. The closure of claim 48 wherein the free edge of said end panel member is encapsulated between said molded skirt and said molded gasket.

50. The closure of claim 48 wherein said free edge of said end panel member is encapsulated within said molded skirt.

51. The closure of claim 48 wherein said free edge of said end panel member is encapsulated within said molded gasket.

52. The closure of claim 48 wherein said gasket is formed by molding the same to both of said end panel and said skirt.

53. The closure of claim 48 wherein said gasket is formed by molding the same to said end panel member.

54. The closure of claim 48 wherein said molded gasket is in contact with both the inner surface of the peripheral portion of said metal end panel and said cylindrical skirt, and a bond between said gasket and cylindrical skirt is stronger than the bond between said gasket and the metal end panel portion in contact therewith, whereby on application of said closure to a container, said gasket will move in axially upward and downward directions to provide an improved side seal with the outer surface of the neck portion of said container.

55. The closure of claim 48 wherein when said closure is applied to a container a radial inwardmost portion of the upper portion of said gasket terminates at a location which is radially outward of at least a radially inwardmost portion of the end surface of the neck container portion defining said mouth, whereby migration of contaminants through said gasket to the contents of the container is minimized.

56. The closure of claim 55 wherein the radially inwardmost portion of the upper portion of said gasket terminates at a location which leaves the major portion of the end surface of said container neck portion substantially free of said gasket.

57. The closure of claim 48 wherein, when a vacuum condition is maintained in a container to which said closure has been applied, said upper annular flange of said skirt is in axially spaced-away relation to the outer periphery of the upper surface of the central portion of said end panel which it overlies.

58. The closure of claim 48 wherein said thermoplastic resin is selected from the group consisting of homopolymers, copolymers and terpolymers of ethylene and propylene.

59. The closure of claim 48 wherein said skirt is formed of polypropylene.

60. The closure of claim 48 wherein said gasket is substantially free of vinyl chloride.

61. The closure of claim 48 wherein said gasket is composed of a thermoplastic elastomer.

62. The closure of claim 48 wherein the lower portion of said tamper band has an axial length greater than the axial length of the upper portion thereof, whereby when said closure is applied to a container, the terminal end of said lower portion of said tamper band extends radially inwardly and upwardly for engagement with a container bead on said container at a location above said circumferentially disposed fracturable bridges.

63. The closure of claim 48 wherein said skirt includes a plurality of circumferentially disposed apertures located above said tamper indicating band, said apertures being sized for passage of liquids into the space between the interior of the skirt and the neck of said container.

64. The closure of claim 63 wherein the lower portion of said tamper indicating band includes a plurality of circumferentially disposed drain holes.

65. A composite closure adapted for press-on application to and rotational removal from a container, said closure comprising: a metal end panel member having a generally circular central portion sized and positioned to overlie a mouth of a container to which said closure is applied, said container mouth being defined by a generally cylindrical neck portion which includes at least one external thread, said end panel member having an upper surface and a lower surface extending into a free edge at a peripheral portion thereof, said peripheral portion including an inner surface and an outer surface adjacent to said free edge, a generally cylindrical flexible skirt composed of a flexible thermoplastic resin, said skirt having been formed by molding the same in surrounding and capturing relation to said end panel, said skirt including at least one preformed internal thread positioned and sized for mating engagement with said at least one external thread of said container neck, said skirt and preformed internal thread having respective internal diameters which enable the press-on application of said closure to a container but which require rotational movement for removal of said closure from said container, said plastic skirt further including an upper annular flange which extends inwardly of and over an outer periphery of the central portion of said end panel member with at least a radial innermost portion of the outer surface of the central portion of said end panel member being exposed; a gasket within said closure, said gasket having been formed by molding the same to at least one of said end panel member and said skirt and being engageable with said neck portion of said container to provide a seal therewith; said free edge and the inner and outer surfaces of said peripheral portion adjacent thereto being encapsulated by at least one of said gasket and said molded plastic skirt and, a cylindrical tamper band extending downwardly from a lower portion of said skirt, said tamper band being integrally formed with said skirt and including an upper portion joined to said skirt by a plurality of circumferentially disposed fracturable bridges and a lower portion which extends radially inwardly and axially upwardly for engagement with a retainer bead on said container and wherein said molded gasket is in contact with both the inner surface of the peripheral portion of said metal end panel and said cylindrical skirt, and a bond between said gasket and cylindrical skirt is stronger than the bond between said gasket and the metal end panel portion in contact therewith, whereby on application of said closure to a container, said gasket will move in axially upward and downward directions to provide an improved side seal with the outer surface of the neck portion of said container.

* * * * *